United States Patent
Leacock

[11] 3,720,475
[45] March 13, 1973

[54] AUTOMATIC MACHINE TOOL

[76] Inventor: Ronald Leacock, 4719 Fielder St., Tampa, Fla. 33611

[22] Filed: Dec. 22, 1970

[21] Appl. No.: 100,714

[52] U.S. Cl. ..................408/44, 408/71, 408/129
[51] Int. Cl. ...............................B23b 39/20
[58] Field of Search....74/55; 29/38 C; 408/3, 43–44, 408/71, 129–130

[56] References Cited

UNITED STATES PATENTS

| | | | |
|---|---|---|---|
| 3,398,608 | 8/1968 | Redmer | 408/68 |
| 2,318,619 | 5/1943 | Noel | 408/44 |
| 1,907,550 | 5/1933 | Knowles | 29/38 C |
| 2,340,450 | 2/1944 | Bouschor | 308/3 A |
| 1,628,234 | 5/1927 | DeLeeuw | 29/38 C |
| 2,872,853 | 2/1959 | Hoern | 74/55 |
| 2,358,389 | 9/1944 | Ewart et al. | 408/44 |
| 1,093,265 | 4/1914 | Hallenbeck | 408/129 |
| 1,694,814 | 12/1928 | Galloway | 408/129 |
| 2,472,744 | 6/1949 | Esson | 408/130 |
| 2,506,958 | 5/1950 | Hallenbeck | 308/3 A |

*Primary Examiner*—Gerald A. Dost
*Attorney*—Howard L. Rose

[57] ABSTRACT

An automatic machine tool includes a head having a rotatable spindle and a head-mounted motor for directly driving the spindle. The head is slidably mounted on a main housing by means of a pair of parallel dovetail engagements, the position of one dovetail track member being selectively adjustable transversely along the housing. A main cam inside the housing translates a cam follower secured directly to the head to slide the head in opposition to a bias force exerted against the head by a fluid-operated piston. De-Actuation of the piston permits translation of the head to an extreme position, providing front access to an opening in the housing which renders the cam accessible. Secondary cams are secured to the same shaft which drives the main cam and actuate control switches as the shaft rotates.

6 Claims, 7 Drawing Figures

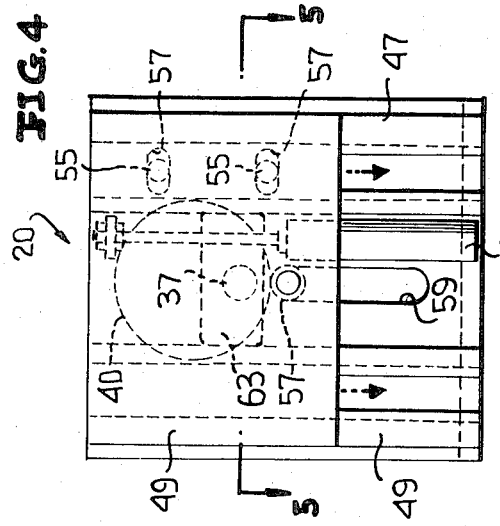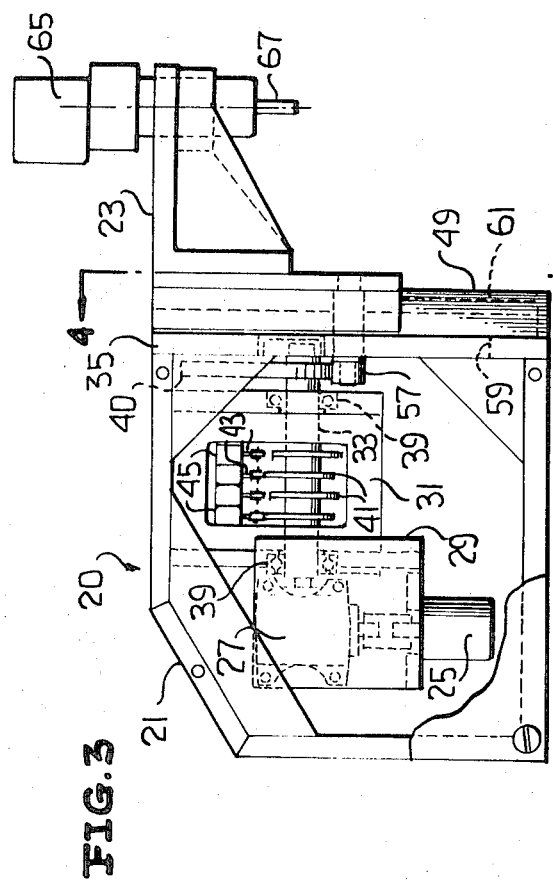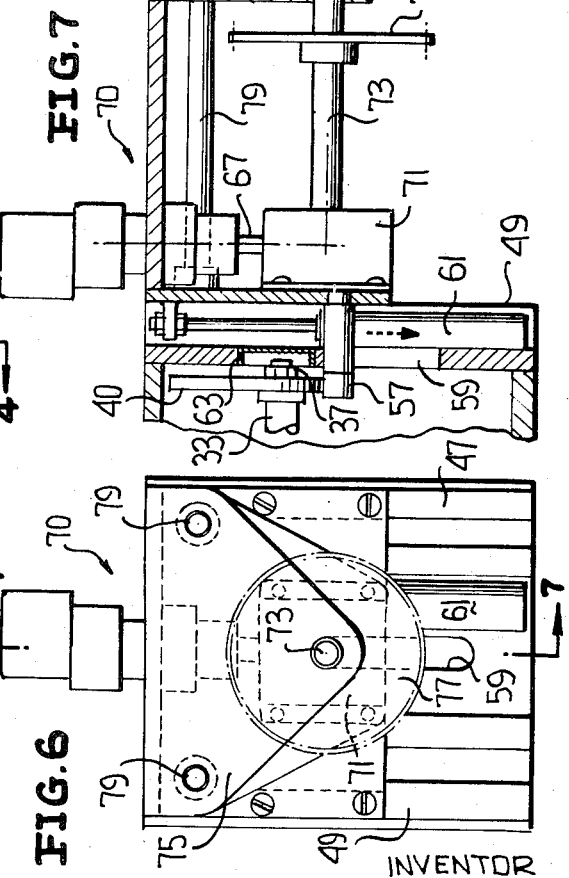

AUTOMATIC MACHINE TOOL

BACKGROUND OF THE INVENTION

The present invention relates to automatic machine tools of the type wherein sequential operations may be performed on a workpiece at different work stations. More particularly, the present invention is concerned with an improved tool attachment head and operation thereof in an automatic machine tool assembly.

U. S. Pat. No. 3,398,608 to Redmer discloses an automatic machine tool representative of the type over which the present invention provides an improvement. Redmer discloses a pair of vertical support posts extending from the top of a housing and slidably engaging a machine tool attachment head. The head includes a rotatable spindle which is driven by a V-belt from a motor mounted on the housing. The head is raised or lowered relative to a translatable work table mounted on the front of the housing. Raising and lowering of the head is effected by a vertical draw bar which is driven by a cam follower which in turn is driven by a cam. The cam is secured to a rotatable shaft which is linked to a countershaft having secondary cams secured thereto. The secondary cams actuate switches to effect various control functions for the overall mechanism.

There are a number of disadvantages associated with the Redmer machine tool. One disadvantage relates to the V-belt spindle drive; specifically, the V-belt tends to produce "chatter" in the head by vibrating it in a direction perpendicular to the spindle axis. Vibratory excursions of the head of one thirty-second inch are common with this arrangement and quite unacceptable for precise machining operations. In addition, since the head is movable relative to the housing, the belt must be provided with slack to accommodate the furthest separation between the motor shaft and head spindle to prevent pivoting of the spindle. This slack tends to produce slippage of the belt and results in unreliable drive characteristics.

Another disadvantage of Redmer's arrangement is the difficulty of access to the main cam. The configuration of the cam determines the nature of the head movement; for different operations, different cam configurations are desirable. The main cam in Redmer is proximate the front wall of the main housing but access to the cam is not possible through the front wall due to the presence of the work table at the front wall and to the disposition of the draw bar between the wall and cam. Consequently, access to the cam must be had by removing a side or rear wall, both being relatively remote from the cam and neither providing sufficient access needed to loosen the cam from its shaft for easy cam interchangeability.

Still another disadvantage of the Redmer machine tool resides in the relative complexity of the cam drive arrangement. Redmer employs a clutch-type cam drive motor which, through a multiple gear arrangement, rotates a main shaft to which the main cam is secured. Experience has shown this arrangement to require frequent maintenance, because of the tendency of the clutch to slip on the upward stroke. This slippage causes the cam to rotate faster than the cam follower, draw bar and head can follow, and the head is effectively disengaged from the cam drive. The bias spring then tends to snap the head back up, a feature which is disadvantageous in itself. Often, instead of snapping up, however, the head support posts tend to stick in their bushings, causing erratic head movement.

Additional complexity is provided by the necessity to interpose a draw bar between the cam follower and attachment head. Still further complexity is introduced by using further gearing to a countershaft to rotate the secondary cams.

Yet another disadvantage with the Redmer arrangement concerns its lack of flexibility in orientation. Specifically, the Redmer head is designed for vertical movement, thereby limiting the types of machining operations it can perform.

It is therefore an object of the present invention to provide an automatic machine tool arrangement which is devoid of the aforementioned disadvantages.

One specific object of the present invention is to provide an automatic machine tool of the type described wherein the "chatter" problem in the head is eliminated. More particularly, it is an object of the present invention to provide a spindle drive which does not vibrate or pivot the machine tool head.

Another object of the present invention is to provide a cam-operated automatic machine tool in which access to the cam is had through a front panel opening proximate the cam position.

Still another object of the present invention is to provide a simple drive arrangement for the main cam and secondary cams in a cam-operated automatic machine tool.

Still another object of the present invention is to provide an automatic machine tool which is capable of efficient operation no matter how it is oriented.

SUMMARY OF THE INVENTION

According to the present invention, direct drive is provided for the spindle by a head-mounted motor. In addition, the head is slidably engaged by the housing by means of a pair of dovetail tracks, the head being biased by a fluid-operated piston against the action of a cam engaging a cam follower directly connected to the head. De-actuation of the piston permits displacement of the head to an extreme position which renders accessible an opening in the front panel of the housing through which the cam may be easily loosened. A single drive shaft is provided for the main cam and secondary cams and is driven by a motor through a relatively simple gear arrangement.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 3 is a detailed side view in elevation of a typical automatic machine tool attachment employed at one of the stations in the assembly of FIG. 1;

FIG. 4 is a front sectional view taken along lines 4—4 of FIG. 3;

FIG. 5 is a top sectional view taken along lines 5—5 of FIG. 4;

FIG. 6 is a front view in elevation of another automatic machine tool attachment employed at a station in FIG. 1; and FIG. 7 is a view in section taken along lines 7—7 of FIG. 6.

DESCRIPTION OF PREFERRED EMBODIMENTS

Figure 1:
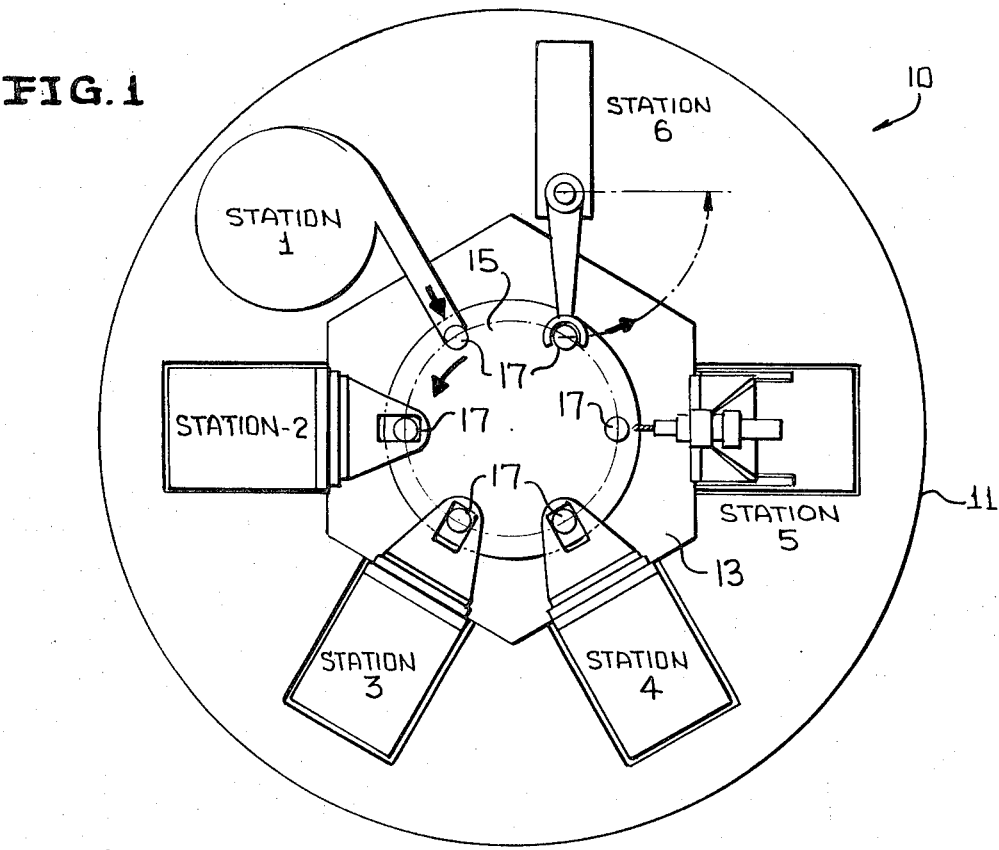
FIG. 1 is a top view in plan of a multi-station automatic machine tool assembly utilizing the principles of the present invention.
Figure 2:
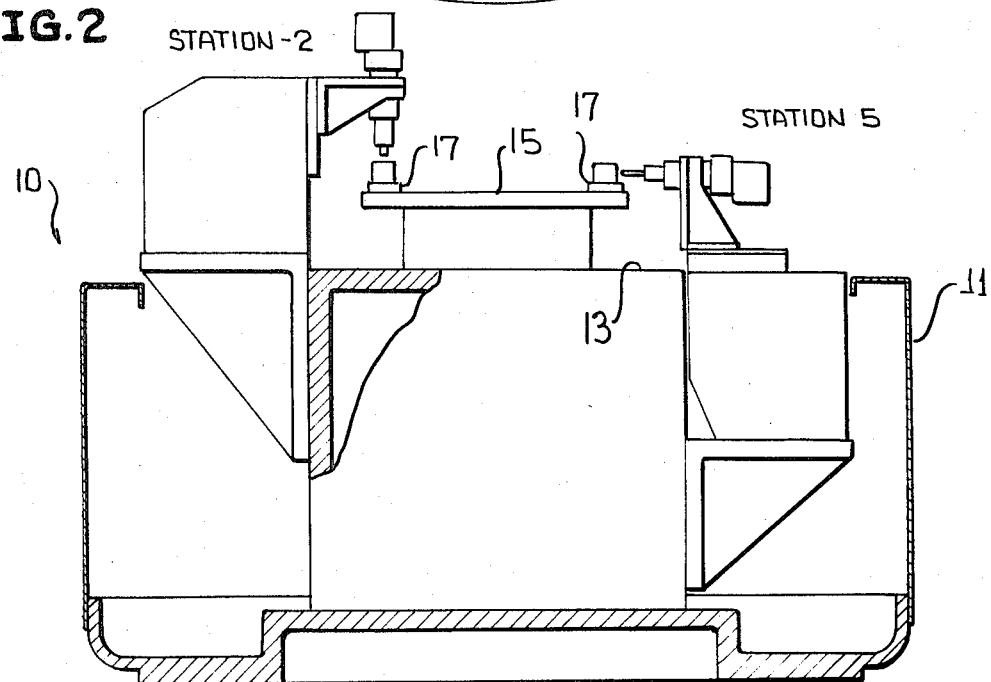
FIG. 2 is a side view of the assembly of FIG. 1.

Referring specifically to FIGS. 1 and 2, an automatic machine tool assembly 10 is arranged to automatically perform a series of machining operations. A control housing 11 for the assembly includes a horizontal hexagonal surface 13 above which is supported a circular indexing table 15. Six workpiece holding elements or chucks 17 are disposed on table 15, 60° apart and at equal radial distances from the center of the table. Six operation stations are defined at the six sides, respectively, of surface 13. Station 1 is an automatic loading station at which the workpiece to be machined is automatically loaded and secured to a chuck 17. Stations 2, 3, 4, 5 include automatic machine tools, according to the principles of the present invention, which perform various machining operations on the workpiece. Station 6 effects automatic unloading of the finished workpiece from the indexing table. The indexing table 15 is arranged to rotate in 60° steps to present the workpiece in proper alignment with the machine tool, loading or unloading mechanism at each station.

As an example, assume the assembly of FIGS. 1 and 2 is arranged to drill a bore having an undercut into a workpiece and then provide a cross drilled hole perpendicular to the bore. After being loaded at station 1, the workpiece is rough-bored at station 2. The bore is finished at station 3 and the undercut is supplied at station 4. The cross-drill operation is effected at station 5 as indicated by fact that the machine tool head at station 5 is oriented perpendicular to the head at stations 2 and 3. The workpiece is automatically unloaded at station 6.

Referring to FIGS. 3, 4 and 5 there is illustrated an automatic machine tool 20 of the type employed in assembly 10 of FIGS. 1 and 2. Machine tool 20 includes a main housing 21 and a machine tool attachment or head 23 which is movable relative to the main housing. Mounted interiorly of main housing 21 is a motor 25 which drives a set of gears in a speed reduction gear box 27. Gear box 27 is supported within main housing 21 by any suitable members generally designated by the numerals 29, 31. A shaft 33 is driven by gear box 27 and extends perpendicularly toward the front wall 35 of main housing 21. Shaft 33 is rotatably supported in support member 31 by means of bearings 39.

A main cam 40 is eccentrically secured to the end of shaft 33 proximate front wall 35 by means of nut 37. An alignment pin 38 mates with an alignment aperture on standard screw machine cams to assure proper rotational position of the cam when it is installed and to provide a positive driving element for the cam. A group of smaller secondary cams 41 are also eccentrically secured to shaft 33 behind the main cam (to the left in FIG. 3) and are arranged to sequentially actuate respective switches 43 at different portions of the rotation cycle of shaft 33. Switches 43 are operatively connected to respective control valves 45 which form part of pneumatic or hydraulic circuits employed to control the various automatic functions performed by assembly 10. The manner in which such circuits operate depends upon the particular operational sequences to be performed, such circuits being well-known as exemplified by the aforementioned U. S. Patent to Redmer. Of course, switches 43 can operate electrical circuits if electrical controls are employed.

Front wall 35 of main housing 21, which is vertical in FIG. 3 although it is not necessarily so positioned, has secured thereto a pair of vertically extending spaced blocks 47, 49. A vertically extending channel is formed in each block 47, 49 and is arranged to serve as the female portion of a slidable dovetail engagement with a suitable male member 51, 53 projecting from rear wall 55 of machine tool attachment 23. Block 49 is either integral with or fixedly secured to front wall 35 by means of bolts or the like. Block 47 is slidably mounted for transverse movement on wall 35 by means of bolts 55 in tracks 57; in this manner the spacing between block 47,49 is adjustable to accommodate variations in spacing between member 51, 53 of different machine tool attachments 23. As each interchangeable machine tool attachment is attached to main housing 21, the lateral position of block 47 is adjusted and tightened to pre-load (i.e.-exert lateral forces upon) the male members 51,53 of the dove-tail engagement.

A cam follower 57 is secured to rear wall 55 of machine tool attachment 23 and extends into main housing 21 through a vertically extending slot 59 defined through front wall 35 of the main housing. Cam follower 57 is engaged by the periphery of main cam 40 and is therefore displaced in slot 59 in accordance with the rotational position of shaft 33.

A selectively actuable hydraulic cylinder 61 includes a shaft secured to rear wall 55 of machine tool attachment 23. During operation of the machine tool, cylinder 61 is actuated to bias attachment 23 upwardly, thereby urging cam follower 57 into engagement with the periphery of main cam 40. The main cam thus drives the cam follower in opposition to the bias action of cylinder 61 and causes the machine tool attachment to slide relative to the main housing via the dovetail engagement. Cylinder 61 acts to prevent "diving," which is the sudden drop of attachment 23 upon breakthrough of the tool through the workpiece. In this context, cylinder 61 provides a positive depth control for the head 23.

When cylinder 61 is de-actuated machine tool attachment 23 slides to its lowermost position, rendering accessible a removable plug 63 covering an access opening in front wall 35 of the main housing. The removable plug can be pulled out to provide access to main cam 40, and particularly to nut 37. Removal of nut 37 is thus simply accomplished for purposes of changing main cams. The cam itself can be slid off shaft 33 and dropped to a position which is accessible from the side of the head. For this purpose the side cover of the head would be removed. In this manner different cam configurations may be employed to effect different strokes of the machine tool. Importantly, the main housing need not be dismantled to change main cams. Importantly, a cam can be changed in less than a minute's time. In the arrangement of the abovementioned Redmer patent, loosening of the cam is a major operation.

Machine tool head 23 itself includes a motor 65, which may be electric or hydraulic, mounted directly on the head. The motor is arranged to provide direct rotary drive to a spindle 67 arranged to hold the tool bit. This direct drive arrangement avoids the chatter inherent in the V-belt drive arrangement of the aforementioned Redmer patent wherein the drive motor is secured to the main housing rather than to the head.

The orientation illustrated in FIGS. 3, 4, 5 for automatic machine tool 20 is by no means exclusive. For example, if machine tool 20, as viewed in FIG. 3, were rotated 90° counterclockwise, spindle 67 would be disposed horizontally rather than vertically and attachment 23 would be slidable horizontally rather than vertically. This orientation is illustrated specifically at station 5 in FIG. 1. In any orientation, the main cam 40 drives cam follower 57 and attachment 23 in opposition to the bias force effected by hydraulic cylinder 61. The dovetail engagement provides reliable slidable engagement for all orientations, and there is no undue stress placed on any element of the machine tool as the orientation is varied.

A variation of the embodiment of FIGS. 3, 4 and 5 is illustrated in FIGS. 6 and 7 wherein machine tool attachment 70 is arranged to performing a milling operation. Attachment or head 70 has identical components to head 20 and also includes a right angle gear box 71, driven by spindle 67, and which rotates a shaft 73 about an axis perpendicular to that of spindle 67. A support 75 depends from the head and is provided with a hole in which shaft 73 is journaled. A milling cutter 77 is mounted on shaft 73 to rotate therewith. If desired a fixed shaft 79 may be secured between support member 75 and the main head body to provide additional stabilization for the milling cutter.

The advantageous features of the present invention may now be summarized briefly:

1. Spindle drive motor 65 is mounted on the head 23 and provides direct drive for spindle 67. This eliminates the chatter and spindle pivoting problems inherent in the prior art.

2. Cam shaft 33 directly drives both the main cam 40 and secondary cams 41, and is itself driven from a motor and a simple speed reduction gear arrangement.

3. The dovetail engagement between head 23 and main housing 21 permits smooth motion of the head for any head orientation. The adjustable dovetail track spacing permits lateral loading for interchangeable heads 23.

4. Simple access is had to the main cam 40 via plug 63 by simply moving the head to an extreme position.

5. Cam follower 57 is secured directly to the head 23 rather than indirectly driving the head through a draw bar or similar arrangement. The resulting head drive is simpler and more reliable.

While I have described and illustrated specific embodiments of my invention, it will be clear that variations of the details of construction which are specifically illustrated and described may be resorted to without departing from the true spirit and scope of the invention as defined in the appended claims.

I claim:

1. An automatic machine tool assembly comprising: an indexing work table arranged to rotate in equal angular steps;
a plurality of stationary work stations positioned along the periphery of said work table at locations spaced by said equal angular steps;
a plurality of workpiece holding elements mounted on said work table at respective locations spaced at said equal angular steps;
a plurality of machine tools, each located at a different work station such that said workpiece holding elements align with said machine tools at index positions of said work table;
wherein at least two of said machine tools each include:
a main housing including at least one wall having a slot defined therein which extends longitudinally towards said work table;
a machine tool carriage;
engagement means for mounting said machine tool carriage on said wall of said main housing to permit slidable motion of said machine tool carriage along said wall;
means for biasing said machine tool carriage in a direction away from said work table and along said wall;
a main eccentric cam mounted within said housing for rotatable motion about an axis perpendicular to said wall;
a cam drive motor located within said housing for rotating said main cam about said axis;
a cam follower secured directly to said machine tool carriage and extending through said slot to the interior of said housing into engagement with said main cam such that said main cam opposes motion of said cam follower away from said work table, said cam follower being responsive to rotation of said main cam for effecting slidable motion of said machine tool carriage along said wall.

2. The automatic machine tool assembly according to claim 1 wherein said machine tools each further include: a spindle rotatably mounted on said machine tool carriage; and a motor mounted on said machine tool carriage for rotatably driving said spindle.

3. The automatic machine tool assembly according to claim 2 wherein said machine tools each further comprise:
a shaft extending above said axis and rotatable by said cam drive motor to in turn drive said main cam;
a plurality of secondary cams secured to said shaft;
a plurality of switches arranged adjacent said shaft for cyclic actuation by respective secondary cams during rotation of said shaft, said switches being arranged to control operational sequences in said machine tool.

4. The automatic machine tool assembly according to claim 1 wherein said engagement means is a dovetail engagement comprising: a pair of male members projecting from said machine tool carriage and extending parallel to one another and to said wall; and a pair of female members extending along said wall and configured to receive said male members in slidable engagement; wherein at least one of said female members is selectively translatable along said wall in a direction transverse to the slidable direction of said carriage.

5. The automatic machine tool assembly according to claim 1 wherein said means for biasing comprises a fluid pressure operated drive member selectively actuable to bias said machine tool carriage away from said work table.

6. The automatic machine tool assembly according to claim 1 further comprising an access opening in said wall of said main housing which is accessible upon deactuation of said fluid pressure operated drive member and translation of said machine tool carriage to its extreme position in the direction toward said work table.

* * * * *